United States Patent
Roen

(10) Patent No.: US 9,431,042 B2
(45) Date of Patent: *Aug. 30, 2016

(54) BALANCED MULTI-TRACE TRANSMISSION IN A HARD DISK DRIVE FLEXURE

(71) Applicant: Hutchinson Technology Incorporated, Hutchinson, MN (US)

(72) Inventor: Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/517,159

(22) Filed: Oct. 17, 2014

(65) Prior Publication Data

US 2015/0194170 A1 Jul. 9, 2015

Related U.S. Application Data

(63) Continuation of application No. 14/146,760, filed on Jan. 3, 2014, now Pat. No. 8,867,173.

(51) Int. Cl.
*G11B 5/48* (2006.01)

(52) U.S. Cl.
CPC ............ *G11B 5/486* (2013.01); *G11B 5/484* (2013.01)

(58) Field of Classification Search
CPC ... G11B 5/486; G11B 5/4853; G11B 5/4846; G11B 5/484; G11B 23/0007; H05K 1/0224; H05K 1/0253; H05K 1/056; H05K 2201/096
USPC .................................. 360/245.8, 245.9, 246
See application file for complete search history.

(56) References Cited

U.S. PATENT DOCUMENTS

| | | | |
|---|---|---|---|
| 3,320,556 A | 5/1967 | Schneider | |
| 4,418,239 A | 11/1983 | Larson et al. | |
| 4,422,906 A | 12/1983 | Kobayashi | |
| 4,659,438 A | 4/1987 | Kuhn et al. | |

(Continued)

FOREIGN PATENT DOCUMENTS

| | | | |
|---|---|---|---|
| EP | 0591954 B1 | 4/1994 | |
| EP | 0834867 B1 | 5/2007 | |

(Continued)

OTHER PUBLICATIONS

Fundamentals of Physics (Halliday and Resnick, Copyright 1981 by John Wiley & Sons, Inc.), cover page, copyright page, and pp. 486-487.*

(Continued)

*Primary Examiner* — Will J Klimowicz
(74) *Attorney, Agent, or Firm* — Faegre Baker Daniels, LLP

(57) ABSTRACT

Various embodiments concern a flexure comprising a base metal layer. The base metal layer can have a void between a first lateral side and a second lateral side. The flexure can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides.

9 Claims, 10 Drawing Sheets

(56) References Cited

U.S. PATENT DOCUMENTS

| | | |
|---|---|---|
| 5,140,288 A | 8/1992 | Grunwell |
| 5,320,272 A | 6/1994 | Melton et al. |
| 5,321,568 A | 6/1994 | Hatam-Tabrizi |
| 5,333,085 A | 7/1994 | Prentice et al. |
| 5,427,848 A | 6/1995 | Baer et al. |
| 5,459,921 A | 10/1995 | Hudson et al. |
| 5,485,053 A | 1/1996 | Baz |
| 5,491,597 A | 2/1996 | Bennin et al. |
| 5,521,778 A | 5/1996 | Boutaghou et al. |
| 5,526,208 A | 6/1996 | Hatch et al. |
| 5,598,307 A | 1/1997 | Bennin |
| 5,608,590 A | 3/1997 | Ziegler et al. |
| 5,608,591 A | 3/1997 | Klaassen et al. |
| 5,631,786 A | 5/1997 | Erpelding |
| 5,636,089 A | 6/1997 | Jurgenson et al. |
| 5,657,186 A | 8/1997 | Kudo et al. |
| 5,657,188 A | 8/1997 | Jurgenson et al. |
| 5,666,241 A | 9/1997 | Summers |
| 5,666,717 A | 9/1997 | Matsumoto et al. |
| 5,694,270 A | 12/1997 | Sone et al. |
| 5,712,749 A | 1/1998 | Gustafson |
| 5,717,547 A | 2/1998 | Young |
| 5,734,526 A | 3/1998 | Symons |
| 5,737,152 A | 4/1998 | Balakrishnan |
| 5,754,368 A | 5/1998 | Shiraishi et al. |
| 5,764,444 A | 6/1998 | Imamura et al. |
| 5,773,889 A | 6/1998 | Love et al. |
| 5,790,347 A | 8/1998 | Girard |
| 5,796,552 A | 8/1998 | Akin, Jr. et al. |
| 5,805,382 A | 9/1998 | Lee et al. |
| 5,812,344 A | 9/1998 | Balakrishnan |
| 5,818,662 A | 10/1998 | Shum |
| 5,862,010 A | 1/1999 | Simmons et al. |
| 5,862,015 A | 1/1999 | Evans et al. |
| 5,889,137 A | 3/1999 | Hutchings et al. |
| 5,892,637 A | 4/1999 | Brooks, Jr. et al. |
| 5,898,544 A | 4/1999 | Krinke et al. |
| 5,914,834 A | 6/1999 | Gustafson |
| 5,921,131 A | 7/1999 | Stange |
| 5,924,187 A | 7/1999 | Matz |
| 5,973,882 A | 10/1999 | Tangren |
| 5,973,884 A | 10/1999 | Hagen |
| 5,986,853 A | 11/1999 | Simmons et al. |
| 5,995,328 A | 11/1999 | Balakrishnan |
| 6,011,671 A | 1/2000 | Masse et al. |
| 6,038,102 A | 3/2000 | Balakrishnan et al. |
| 6,046,887 A | 4/2000 | Uozumi et al. |
| 6,055,132 A | 4/2000 | Arya et al. |
| 6,075,676 A | 6/2000 | Hiraoka et al. |
| 6,078,470 A | 6/2000 | Danielson et al. |
| 6,108,175 A | 8/2000 | Hawwa et al. |
| 6,118,637 A | 9/2000 | Wright et al. |
| 6,144,531 A | 11/2000 | Sawai |
| 6,146,813 A | 11/2000 | Girard et al. |
| 6,156,982 A | 12/2000 | Dawson |
| 6,157,522 A | 12/2000 | Murphy et al. |
| 6,172,853 B1 | 1/2001 | Davis et al. |
| 6,181,520 B1 | 1/2001 | Fukuda |
| 6,195,227 B1 | 2/2001 | Fan et al. |
| 6,215,622 B1 | 4/2001 | Ruiz et al. |
| 6,229,673 B1 | 5/2001 | Shinohara et al. |
| 6,233,122 B1 * | 5/2001 | Summers ............... 360/246 |
| 6,233,124 B1 | 5/2001 | Budde et al. |
| 6,239,953 B1 | 5/2001 | Mei |
| 6,246,546 B1 | 6/2001 | Tangren |
| 6,246,552 B1 | 6/2001 | Soeno et al. |
| 6,249,404 B1 | 6/2001 | Doundakov et al. |
| 6,262,868 B1 | 7/2001 | Arya et al. |
| 6,275,358 B1 | 8/2001 | Balakrishnan et al. |
| 6,278,587 B1 | 8/2001 | Mei |
| 6,282,062 B1 | 8/2001 | Shiraishi |
| 6,295,185 B1 | 9/2001 | Stefansky |
| 6,297,936 B1 | 10/2001 | Kant et al. |
| 6,300,846 B1 | 10/2001 | Brunker |
| 6,307,715 B1 | 10/2001 | Berding et al. |
| 6,320,730 B1 | 11/2001 | Stefansky et al. |
| 6,330,132 B1 | 12/2001 | Honda |
| 6,349,017 B1 | 2/2002 | Schott |
| 6,376,964 B1 | 4/2002 | Young et al. |
| 6,396,667 B1 | 5/2002 | Zhang et al. |
| 6,399,899 B1 | 6/2002 | Ohkawa et al. |
| 6,400,532 B1 | 6/2002 | Mei |
| 6,404,594 B1 | 6/2002 | Maruyama et al. |
| 6,424,500 B1 | 7/2002 | Coon et al. |
| 6,445,546 B1 | 9/2002 | Coon |
| 6,459,549 B1 | 10/2002 | Tsuchiya et al. |
| 6,490,228 B2 | 12/2002 | Killam |
| 6,493,190 B1 | 12/2002 | Coon |
| 6,493,192 B2 | 12/2002 | Crane et al. |
| 6,539,609 B2 | 4/2003 | Palmer et al. |
| 6,549,376 B1 | 4/2003 | Scura et al. |
| 6,549,736 B2 | 4/2003 | Miyabe et al. |
| 6,563,676 B1 | 5/2003 | Chew et al. |
| 6,596,184 B1 | 7/2003 | Shum et al. |
| 6,597,541 B2 | 7/2003 | Nishida et al. |
| 6,600,631 B1 | 7/2003 | Berding et al. |
| 6,608,736 B1 | 8/2003 | Klaassen et al. |
| 6,621,653 B1 | 9/2003 | Schirle |
| 6,621,658 B1 | 9/2003 | Nashif |
| 6,636,388 B2 | 10/2003 | Stefansaky |
| 6,639,761 B1 | 10/2003 | Boutaghou et al. |
| 6,647,621 B1 | 11/2003 | Roen et al. |
| 6,661,617 B1 | 12/2003 | Hipwell, Jr. et al. |
| 6,661,618 B2 | 12/2003 | Fujiwara et al. |
| 6,704,157 B2 | 3/2004 | Himes et al. |
| 6,704,158 B2 | 3/2004 | Hawwa et al. |
| 6,714,384 B2 | 3/2004 | Himes et al. |
| 6,714,385 B1 | 3/2004 | Even et al. |
| 6,724,580 B2 | 4/2004 | Irie et al. |
| 6,728,057 B2 | 4/2004 | Putnam |
| 6,728,077 B1 | 4/2004 | Murphy |
| 6,731,472 B2 | 5/2004 | Okamoto et al. |
| 6,735,052 B2 | 5/2004 | Dunn et al. |
| 6,735,055 B1 | 5/2004 | Crane et al. |
| 6,737,931 B2 | 5/2004 | Amparan et al. |
| 6,738,225 B1 | 5/2004 | Summers et al. |
| 6,741,424 B1 | 5/2004 | Danielson et al. |
| 6,751,062 B2 | 6/2004 | Kasajima et al. |
| 6,760,182 B2 | 7/2004 | Bement et al. |
| 6,760,194 B2 | 7/2004 | Shiraishi et al. |
| 6,760,196 B1 | 7/2004 | Niu et al. |
| 6,762,913 B1 | 7/2004 | Even et al. |
| 6,765,761 B2 | 7/2004 | Arya |
| 6,771,466 B2 | 8/2004 | Kasajima et al. |
| 6,771,467 B2 | 8/2004 | Kasajima et al. |
| 6,791,802 B2 | 9/2004 | Watanabe et al. |
| 6,796,018 B1 | 9/2004 | Thornton |
| 6,798,597 B1 | 9/2004 | Aram et al. |
| 6,801,402 B1 | 10/2004 | Subrahmanyam et al. |
| 6,831,539 B1 | 12/2004 | Hipwell, Jr. et al. |
| 6,833,978 B2 | 12/2004 | Shum et al. |
| 6,839,204 B2 | 1/2005 | Shiraishi et al. |
| 6,841,737 B2 | 1/2005 | Komatsubara et al. |
| 6,856,075 B1 | 2/2005 | Houk et al. |
| 6,898,042 B2 | 5/2005 | Subrahmanyan |
| 6,900,967 B1 * | 5/2005 | Coon et al. ............... 360/245.9 |
| 6,922,305 B2 | 7/2005 | Price |
| 6,934,127 B2 | 8/2005 | Yao et al. |
| 6,942,817 B2 | 9/2005 | Yagi et al. |
| 6,943,991 B2 | 9/2005 | Yao et al. |
| 6,950,288 B2 | 9/2005 | Yao et al. |
| 6,963,471 B2 | 11/2005 | Arai et al. |
| 6,975,488 B1 | 12/2005 | Kulangara et al. |
| 6,977,790 B1 | 12/2005 | Chen et al. |
| 7,006,333 B1 | 2/2006 | Summers |
| 7,016,159 B1 | 3/2006 | Bjorstrom et al. |
| 7,020,949 B2 | 4/2006 | Muramatsu et al. |
| 7,023,667 B2 | 4/2006 | Shum |
| 7,050,267 B2 | 5/2006 | Koh et al. |
| 7,057,857 B1 | 6/2006 | Niu et al. |
| 7,064,928 B2 | 6/2006 | Fu et al. |
| 7,079,357 B1 | 7/2006 | Kulangara et al. |
| 7,082,670 B2 | 8/2006 | Boismier et al. |
| 7,092,215 B2 | 8/2006 | Someya et al. |

(56) References Cited

U.S. PATENT DOCUMENTS

| | | | |
|---|---|---|---|
| 7,130,159 B2 | 10/2006 | Shimizu et al. |
| 7,132,607 B2 | 11/2006 | Yoshimi et al. |
| 7,142,395 B2 | 11/2006 | Swanson et al. |
| 7,144,687 B2 | 12/2006 | Fujisaki et al. |
| 7,159,300 B2 | 1/2007 | Yao et al. |
| 7,161,767 B2 | 1/2007 | Hernandez et al. |
| 7,177,119 B1 | 2/2007 | Bennin et al. |
| 7,218,481 B1 | 5/2007 | Bennin et al. |
| 7,256,968 B1 | 8/2007 | Krinke |
| 7,271,958 B2 | 9/2007 | Yoon et al. |
| 7,292,413 B1 | 11/2007 | Coon |
| 7,307,817 B1 | 12/2007 | Mei |
| 7,322,241 B2 | 1/2008 | Kai |
| 7,336,436 B2 | 2/2008 | Sharma et al. |
| 7,342,750 B2 | 3/2008 | Yang et al. |
| 7,345,851 B2 | 3/2008 | Hirano et al. |
| 7,375,930 B2 | 5/2008 | Yang et al. |
| 7,379,274 B2 | 5/2008 | Yao et al. |
| 7,382,582 B1 | 6/2008 | Cuevas |
| 7,385,788 B2 | 6/2008 | Kubota et al. |
| 7,391,594 B2 | 6/2008 | Fu et al. |
| 7,403,357 B1 | 7/2008 | Williams |
| 7,408,745 B2 | 8/2008 | Yao et al. |
| 7,417,830 B1 | 8/2008 | Kulangara |
| 7,420,778 B2 | 9/2008 | Sassine et al. |
| 7,459,835 B1 | 12/2008 | Mei et al. |
| 7,460,337 B1 | 12/2008 | Mei |
| 7,466,520 B2 | 12/2008 | White et al. |
| 7,499,246 B2 | 3/2009 | Nakagawa |
| 7,509,859 B2 | 3/2009 | Kai |
| 7,518,830 B1 | 4/2009 | Panchal et al. |
| 7,567,410 B1 | 7/2009 | Zhang et al. |
| 7,595,965 B1 | 9/2009 | Kulangara et al. |
| RE40,975 E | 11/2009 | Evans et al. |
| 7,625,654 B2 | 12/2009 | Vyas et al. |
| 7,643,252 B2 | 1/2010 | Arai et al. |
| 7,649,254 B2 | 1/2010 | Graydon et al. |
| 7,663,841 B2 | 2/2010 | Budde et al. |
| 7,667,921 B2 | 2/2010 | Satoh et al. |
| 7,675,713 B2 | 3/2010 | Ogawa et al. |
| 7,688,552 B2 | 3/2010 | Yao et al. |
| 7,692,899 B2 | 4/2010 | Arai et al. |
| 7,701,673 B2 | 4/2010 | Wang et al. |
| 7,701,674 B2 | 4/2010 | Arai |
| 7,710,687 B1 | 5/2010 | Carlson et al. |
| 7,719,798 B2 | 5/2010 | Yao |
| 7,724,478 B2 | 5/2010 | Deguchi et al. |
| 7,751,153 B1 | 7/2010 | Kulangara et al. |
| 7,768,746 B2 | 8/2010 | Yao et al. |
| 7,782,572 B2 | 8/2010 | Pro |
| 7,813,083 B2 | 10/2010 | Guo et al. |
| 7,821,742 B1 | 10/2010 | Mei |
| 7,832,082 B1 | 11/2010 | Hentges et al. |
| 7,835,113 B1 | 11/2010 | Douglas |
| 7,872,344 B2 | 1/2011 | Fjelstad et al. |
| 7,875,804 B1 | 1/2011 | Tronnes et al. |
| 7,902,639 B2 | 3/2011 | Garrou et al. |
| 7,914,926 B2 | 3/2011 | Kimura et al. |
| 7,923,644 B2 | 4/2011 | Ishii et al. |
| 7,924,530 B1 | 4/2011 | Chocholaty |
| 7,929,252 B1 | 4/2011 | Hentges et al. |
| 7,983,008 B2 | 7/2011 | Liao et al. |
| 7,986,494 B2 | 7/2011 | Pro |
| 8,004,798 B1 | 8/2011 | Dunn |
| 8,085,508 B2 | 12/2011 | Hatch |
| 8,089,728 B2 | 1/2012 | Yao et al. |
| 8,120,878 B1 | 2/2012 | Drape et al. |
| 8,125,736 B2 | 2/2012 | Nojima et al. |
| 8,125,741 B2 | 2/2012 | Shelor |
| 8,144,436 B2 | 3/2012 | Iriuchijima et al. |
| 8,149,542 B2 | 4/2012 | Ando |
| 8,151,440 B2 | 4/2012 | Tsutsumi et al. |
| 8,154,827 B2 | 4/2012 | Contreras et al. |
| 8,161,626 B2 | 4/2012 | Ikeji |
| 8,169,746 B1 | 5/2012 | Rice et al. |
| 8,174,797 B2 | 5/2012 | Iriuchijima |
| 8,189,281 B2 | 5/2012 | Alex et al. |
| 8,189,301 B2 | 5/2012 | Schreiber |
| 8,194,359 B2 | 6/2012 | Yao et al. |
| 8,199,441 B2 | 6/2012 | Nojima |
| 8,228,642 B1 | 7/2012 | Hahn et al. |
| 8,233,240 B2 | 7/2012 | Contreras et al. |
| 8,248,731 B2 | 8/2012 | Fuchino |
| 8,248,734 B2 | 8/2012 | Fuchino |
| 8,248,735 B2 | 8/2012 | Fujimoto et al. |
| 8,248,736 B2 | 8/2012 | Hanya et al. |
| 8,254,062 B2 | 8/2012 | Greminger |
| 8,259,416 B1 | 9/2012 | Davis et al. |
| 8,264,797 B2 | 9/2012 | Emley |
| 8,289,652 B2 | 10/2012 | Zambri et al. |
| 8,289,656 B1 | 10/2012 | Huber |
| 8,295,012 B1 | 10/2012 | Tian et al. |
| 8,300,362 B2 | 10/2012 | Virmani et al. |
| 8,300,363 B2 | 10/2012 | Arai et al. |
| 8,305,712 B2 | 11/2012 | Contreras et al. |
| 8,310,790 B1 | 11/2012 | Fanslau, Jr. |
| 8,331,061 B2 | 12/2012 | Hanya et al. |
| 8,339,748 B2 | 12/2012 | Shum et al. |
| 8,351,160 B2 | 1/2013 | Fujimoto |
| 8,363,361 B2 | 1/2013 | Hanya et al. |
| 8,379,349 B1 | 2/2013 | Pro et al. |
| 8,446,694 B1 | 5/2013 | Tian et al. |
| 8,456,780 B1 | 6/2013 | Ruiz |
| 8,498,082 B1 | 7/2013 | Padeski et al. |
| 8,526,142 B1 | 9/2013 | Dejkoonmak et al. |
| 8,542,465 B2 | 9/2013 | Liu et al. |
| 8,559,137 B2 | 10/2013 | Imuta |
| 8,665,565 B2 | 3/2014 | Pro et al. |
| 8,675,314 B1 | 3/2014 | Bjorstrom et al. |
| 8,681,456 B1 | 3/2014 | Miller et al. |
| 8,705,210 B2 * | 4/2014 | Arai ................ G11B 5/486 360/245.9 |
| 8,867,173 B1 * | 10/2014 | Roen ................ 360/245.9 |
| 2001/0012181 A1 | 8/2001 | Inoue et al. |
| 2001/0013993 A1 | 8/2001 | Coon |
| 2001/0030838 A1 | 10/2001 | Takadera et al. |
| 2001/0043443 A1 | 11/2001 | Okamoto et al. |
| 2002/0075606 A1 | 6/2002 | Nishida et al. |
| 2002/0118492 A1 | 8/2002 | Watanabe et al. |
| 2002/0149888 A1 | 10/2002 | Motonishi et al. |
| 2002/0176209 A1 | 11/2002 | Schulz et al. |
| 2003/0011118 A1 | 1/2003 | Kasajima et al. |
| 2003/0011936 A1 | 1/2003 | Himes et al. |
| 2003/0053258 A1 | 3/2003 | Dunn et al. |
| 2003/0135985 A1 | 7/2003 | Yao et al. |
| 2003/0174445 A1 | 9/2003 | Luo |
| 2003/0202293 A1 | 10/2003 | Nakamura et al. |
| 2003/0210499 A1 | 11/2003 | Arya |
| 2004/0027727 A1 | 2/2004 | Shimizu et al. |
| 2004/0027728 A1 | 2/2004 | Coffey et al. |
| 2004/0070884 A1 | 4/2004 | Someya et al. |
| 2004/0125508 A1 | 7/2004 | Yang et al. |
| 2004/0181932 A1 | 9/2004 | Yao et al. |
| 2004/0207957 A1 | 10/2004 | Kasajima et al. |
| 2005/0061542 A1 | 3/2005 | Aonuma et al. |
| 2005/0063097 A1 | 3/2005 | Maruyama et al. |
| 2005/0105217 A1 | 5/2005 | Kwon et al. |
| 2005/0180053 A1 | 8/2005 | Dovek et al. |
| 2005/0254175 A1 | 11/2005 | Swanson et al. |
| 2005/0280944 A1 | 12/2005 | Yang et al. |
| 2006/0044698 A1 | 3/2006 | Hirano et al. |
| 2006/0077614 A1 | 4/2006 | White et al. |
| 2006/0092572 A1 * | 5/2006 | Kiyono .................. 360/245.9 |
| 2006/0134852 A1 * | 6/2006 | Jang .................. G11B 5/4853 438/232 |
| 2006/0181812 A1 | 8/2006 | Kwon et al. |
| 2006/0193086 A1 | 8/2006 | Zhu et al. |
| 2006/0209465 A1 | 9/2006 | Takikawa et al. |
| 2006/0238924 A1 | 10/2006 | Gatzen |
| 2006/0274452 A1 | 12/2006 | Arya |
| 2006/0274453 A1 | 12/2006 | Arya |
| 2006/0279880 A1 | 12/2006 | Boutaghou et al. |
| 2007/0133128 A1 | 6/2007 | Arai |
| 2007/0153430 A1 | 7/2007 | Park et al. |

(56) References Cited

U.S. PATENT DOCUMENTS

| | | |
|---|---|---|
| 2007/0223146 A1 | 9/2007 | Yao et al. |
| 2007/0227769 A1 | 10/2007 | Brodsky et al. |
| 2007/0253176 A1 | 11/2007 | Ishii et al. |
| 2008/0084638 A1 | 4/2008 | Bonin |
| 2008/0144225 A1 | 6/2008 | Yao et al. |
| 2008/0192384 A1 | 8/2008 | Danielson et al. |
| 2008/0198511 A1 | 8/2008 | Hirano et al. |
| 2008/0229842 A1 | 9/2008 | Ohtsuka et al. |
| 2008/0273266 A1 | 11/2008 | Pro |
| 2008/0273269 A1 | 11/2008 | Pro |
| 2009/0027807 A1 | 1/2009 | Yao et al. |
| 2009/0080117 A1 | 3/2009 | Shimizu et al. |
| 2009/0135523 A1 | 5/2009 | Nishiyama et al. |
| 2009/0147407 A1 | 6/2009 | Huang et al. |
| 2009/0168249 A1 | 7/2009 | McCaslin et al. |
| 2009/0176120 A1 | 7/2009 | Wang |
| 2009/0190263 A1 | 7/2009 | Miura et al. |
| 2009/0244786 A1 | 10/2009 | Hatch |
| 2009/0294740 A1 | 12/2009 | Kurtz et al. |
| 2010/0007993 A1 | 1/2010 | Contreras et al. |
| 2010/0067151 A1 | 3/2010 | Okaware et al. |
| 2010/0073825 A1 | 3/2010 | Okawara |
| 2010/0097726 A1 | 4/2010 | Greminger et al. |
| 2010/0143743 A1 | 6/2010 | Yamasaki et al. |
| 2010/0165515 A1 | 7/2010 | Ando |
| 2010/0165516 A1 | 7/2010 | Fuchino |
| 2010/0177445 A1 | 7/2010 | Fuchino |
| 2010/0195252 A1 | 8/2010 | Kashima |
| 2010/0208390 A1 | 8/2010 | Hanya et al. |
| 2010/0220414 A1 | 9/2010 | Klarqvist et al. |
| 2010/0246071 A1 | 9/2010 | Nojima et al. |
| 2010/0271735 A1 | 10/2010 | Schreiber |
| 2010/0290158 A1 | 11/2010 | Hanya et al. |
| 2011/0013319 A1 | 1/2011 | Soga et al. |
| 2011/0058282 A1 | 3/2011 | Fujimoto et al. |
| 2011/0096438 A1 | 4/2011 | Takada et al. |
| 2011/0123145 A1 | 5/2011 | Nishio |
| 2011/0141624 A1 | 6/2011 | Fuchino et al. |
| 2011/0141626 A1 | 6/2011 | Contreras et al. |
| 2011/0228425 A1 | 9/2011 | Liu et al. |
| 2011/0242708 A1 | 10/2011 | Fuchino |
| 2011/0279929 A1 | 11/2011 | Kin |
| 2011/0299197 A1 | 12/2011 | Eguchi |
| 2012/0002329 A1 | 1/2012 | Shum et al. |
| 2012/0081813 A1 | 4/2012 | Ezawa et al. |
| 2012/0081815 A1 | 4/2012 | Arai et al. |
| 2012/0113547 A1 | 5/2012 | Sugimoto |
| 2012/0279757 A1 | 11/2012 | Ishii et al. |
| 2012/0281316 A1 | 11/2012 | Fujimoto et al. |
| 2013/0107488 A1 | 5/2013 | Arai |
| 2013/0176646 A1 | 7/2013 | Arai |
| 2013/0242434 A1 | 9/2013 | Bjorstrom et al. |
| 2013/0242436 A1 | 9/2013 | Yonekura et al. |
| 2013/0265674 A1 | 10/2013 | Fanslau |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0022675 A1 | 1/2014 | Hanya et al. |
| 2014/0063660 A1 | 3/2014 | Bjorstrom et al. |
| 2014/0078621 A1 | 3/2014 | Miller et al. |
| 2014/0098440 A1 | 4/2014 | Miller et al. |
| 2014/0168821 A1 | 6/2014 | Miller |

FOREIGN PATENT DOCUMENTS

| | | |
|---|---|---|
| JP | 9198825 A | 7/1997 |
| JP | 10003632 A | 1/1998 |
| JP | 2001057039 A | 2/2001 |
| JP | 2001202731 A | 7/2001 |
| JP | 2001307442 A | 11/2001 |
| JP | 2002050140 A | 2/2002 |
| JP | 2002170607 A | 6/2002 |
| JP | 2003223771 A | 8/2003 |
| JP | 2003234549 A | 8/2003 |
| JP | 2002039056 A | 2/2004 |
| JP | 2004300489 A | 10/2004 |
| JP | 2005209336 A | 8/2005 |
| JP | 2008276927 A | 11/2008 |
| WO | WO9820485 A1 | 5/1998 |

OTHER PUBLICATIONS

International Search Report and Written Opinion issued in PCT/US2013/059702, dated Mar. 28, 2014, 9 pages.

"Calculating VLSI Wiring Capacitance", Jun. 1990, IBM Technical Disclosure Bulletin, vol. 33, Issue No. 1A, 2 pages.

Cheng, Yang-Tse, "Vapor deposited thin gold coatings for high temperature electrical contacts", Electrical Contacts, 1996, Joint with the 18th International Conference on Electrical Contacts, Proceedings of the Forty-Second IEEE Holm Conference, Sep. 16-20, 1996 (abstract only).

Fu, Yao, "Design of a Hybrid Magnetic and Piezoelectric Polymer Microactuator", a thesis submitted to Industrial Research Institute Swinburne (IRIS), Swinburne University of Technology, Hawthorn, Victoria, Australia, Dec. 2005.

Harris, N.R. et al., "A Multilayer Thick-film PZT Actuator for MEMs Applications", Sensors and Actuators A: Physical, vol. 132, No. 1, Nov. 8, 2006, pp. 311-316.

Hentges, Reed T. et al., "Exploring Low Loss Suspension Interconnects for High Data Rates in Hard Disk Drives", IEEE Transactions on Magnetics. vol. 44, No. 1, Jan. 2008, pp. 169-174.

International Search Report and Written Opinion issued in PCT/US13/75320, mailed May 20, 2014, 10 pages.

International Search Report and Written Opinion issued in PCT/US2013/031484, mailed May 30, 2013, 13 pages.

International Search Report and Written Opinion issued in PCT/US2013/052885, mailed Feb. 7, 2014, 13 pages.

International Search Report and Written Opinion issued in PCT/US2013/064314, dated Apr. 18, 2014, 10 pages.

Jing, Yang, "Fabrication of piezoelectric ceramic micro-actuator and its reliability for hard disk drives", Ultrasonics, Ferroelectrics and Frequency Control, IEEE, vol. 51, No. 11, Nov. 2004, pp. 1470-1476 (abstract only).

Kon, Stanley et al. "Piezoresistive and Piezoelectric MEMs Strain Sensors for Vibration Detection", Sensors and Smart Structures Technologies for Civil, Mechanical, and Aerospace Systems 2007, Proc. of SPIE vol. 6529.

Lengert, David et al., "Design of suspension-based and collocated dual stage actuated suspensions", Microsyst Technol (2012) 18:1615-1622.

Li, Longqiu et al., "An experimental study of the dimple-gimbal interface in a hard disk drive", Microsyst Technol (2011) 17:863-868.

Pichonat, Tristan et al., "Recent developments in MEMS-based miniature fuel cells", Microsyst Technol (2007) 13:1671-1678.

Pozar, David M, Microwave Engineering, 4th Edition, copyright 2012 by John Wiley & Sons, Inc., pp. 422-426.

Raeymaekers, B. et al., "Investigation of fretting wear at the dimple/gimbal interface in a hard disk drve suspension", Wear, vol. 268, Issues 11-12, May 12, 2010, pp. 1347-1353.

Raeymaekers Bart et al., "Fretting Wear Between a Hollow Sphere and Flat Surface" Proceedings of the STLE/ASME International Joint Tribology Conference, Oct. 19-21, 2009, Memphis, TN USA, 4 pages.

Rajagopal, Indira et al., "Gold Plating of Critical Components for Space Applications: Challenges and Solutions", Gold Bull., 1992, 25(2), pp. 55-66.

U.S. Appl. No. 13/365,443, to Miller, Mark A., entitled Elongated Trace Tethers for Disk Drive Head Suspension Flexures, filed Feb. 3, 2012.

U.S. Appl. No. 13/690,883 to Tobias, Kyle T. et al., entitled Microstructure Patterned Surfaces for Integrated Lead Head Suspensions, filed Nov. 30, 2012.

U.S. Appl. No. 13/827,622 to Bjorstrom, Jacob D. et al., entitled Mid-Loadbeam Dual Stage Actuated (DSA) Disk Drive Head Suspension, filed Mar. 14, 2013.

(56) References Cited

OTHER PUBLICATIONS

U.S. Appl. No. 14/056,481 entitled Two-Motor Co-Located Gimbal-Based Dual Stage Actuation Disk Drive Suspensions With Motor Stiffeners, filed Oct. 17, 2013.
U.S. Appl. No. 14/103,955 to Bjorstrom, Jacob D. et al., entitled Electrical Contacts to Motors in Dual Stage Actuated Suspensions, filed Dec. 12, 2013.
U.S. Appl. No. 14/141,617 to Bennin, Jeffry S. et al., entitled Disk Drive Suspension Assembly Having a Partially Flangeless Load Point Dimple, filed Dec. 27, 2013, 53 pages.
U.S. Appl. No. 14/145,515 to Miller, Mark A. et al., entitled Balanced Co-Located Gimbal-Based Dual Stage Actuation Disk Drive Suspensions, filed Dec. 31, 2013, 39 pages.
U.S. Appl. No. 14/163,279 to Roen, Michael E. entitled Stepped Impedance Flexure Design in a Hard Disk Drive, filed Jan. 24, 2014.
U.S. Appl. No. 14/216,288 to Miller, Mark A. et al., entitled Co-Located Gimbal-Based Dual Stage Actuation Disk Drive Suspension, filed Mar. 17, 2014, 84 pages.
U.S. Appl. No. 61/396,239 entitled Low Resistance Ground Joints for Dual Stage Actuation Disk Drive Suspensions, filed May 24, 2010, 16 pages.
U.S. Appl. No. 13/955,204 to Bjorstrom, Jacob D. et al., entitled Damped Dual Stage Actuation Disk Drive Suspensions, filed Jul. 31, 2013.
U.S. Appl. No. 13/955,204, to Bjorstrom, Jacob D. et al., Non-Final Office Action issued on Mar. 24, 2014, 7 pages.
U.S. Appl. No. 13/955,204, to Bjorstrom, Jacob D. et al., Non-Final Office Action issued on Oct. 29, 2013, 9 pages.
U.S. Appl. No. 13/955,204, to Bjorstrom, Jacob D. et al., Notice of Allowance issued on Jan. 7, 2014, 6 pages.
U.S. Appl. No. 13/955,204, to Bjorstrom, Jacob D. et al., Notice of Allowance issued on May 6, 2014, 5 pages.
U.S. Appl. No. 13/955,204, to Bjorstrom, Jacob D. et al., Response filed Apr. 18, 2014 to Non-Final Office Action issued on Mar. 24, 2014, 9 pages.
U.S. Appl. No. 13/955,204, to Bjorstrom, Jacob D. et al., Response filed Nov. 19, 2013 to Non-Final Office Action issued on Oct. 29, 2013, 11 pages.
U.S. Appl. No. 13/972,137 to Bjorstrom, Jacob D. et al., entited Co-Located Gimbal-Based Dual Stage Actuation Disk Drive Suspensions With Offset Motors, filed Aug. 21, 2013.
U.S. Appl. No. 13/972,137, to Bjorstrom, Jacob D. et al., Non-Final Office Action issued Nov. 5, 2013.
U.S. Appl. No. 13/972,137, to Bjorstrom, Jacob D. et al., Notice of Allowance issued on Jan. 17, 2014, 5 pages.
U.S. Appl. No. 13/972,137, to Bjorstrom, Jacob D. et al., Response filed Dec. 2, 2013 to Non-Final Office Action issued Nov. 5, 2013, 12 pages.
U.S. Appl. No. 14/026,427 to Miller, Mark A., entitled Co-Located Gimbal-Based Dual Stage Actuation Disk Drive Suspensions, filed Sep. 13, 2013.
U.S. Appl. No. 14/044,238 to Miller, Mark A., entitled Co-Located Gimbal-Based Dual Stage Actuation Disk Drive Suspensions With Motor Stifeners, filed Oct. 2, 2013.
U.S. Appl. No. 14/044,238 to Miller, Mark A., Non-Final Office Action issued on Feb. 6, 2014, 9 pages.
U.S. Appl. No. 14/044,238, to Miller, Mark A., Response filed Apr. 22, 2014 to Non-Final Office Action issued on Feb. 6, 2014, 11 pages.
U.S. Appl. No. 14/050,660, to Miller, Mark A. et al., entitled Co-Located Gimbal-Based Dual Stage Actuation Disk Drive Suspensions With Dampers, filed Oct. 10, 2013.
U.S. Appl. No. 14/050,660, to Miller, Mark A., et al., Non-Final Office Action issued on Mar. 31, 2014, 9 pages.
U.S. Appl. No. 14/146,760, to Roen, Michael E. entitled Balanced Multi-Trace Transmission in a Hard Disk Drive Flexure, filed Jan. 3, 2014, 32 pages.
Yoon, Wonseok et al., "Evaluation of coated metallic bipolar plates for polymer electrolyte membrane fuel cells", The Journal of Power Sources, vol. 179, No. 1, Apr. 15, 2008, pp. 265-273.
International Search Report and Written Opinion issued in PCT/US2014/072949, mailed Mar. 19, 2015, 13 pages.

\* cited by examiner

BALANCED MULTI-TRACE TRANSMISSION IN A HARD DISK DRIVE FLEXURE

CROSS-REFERENCE TO RELATED APPLICATION

This application is a continuation of U.S. patent application Ser. No. 14/146,760, filed Jan. 3, 2014, entitled BALANCED MULTI-TRACE TRANSMISSION IN A HARD DISK DRIVE FLEXURE, which application is incorporated herein by reference in its entirety and for all purposes.

TECHNICAL FIELD

The present invention relates to disk drives. In particular, various embodiments of the invention concern a flexure having arrays of traces with the same width and/or signal propagation rates.

BACKGROUND

Disk drive flexures are generally known and commercially available. Typical flexures transmit signals along disk drive suspensions. Flexures comprise traces that extend along the suspension to electrically connect disk drive control circuitry with electrical elements such as read/write transducers on the distal end of the suspensions. FIG. 1 shows a plan view of a flexure 1. The flexure 1 includes a proximal end 6 and a distal end 5. A trace array 4 extends along the flexure 1 from the proximal end 6 to the distal end 5. The trace array 4 can be one of several trace arrays, such as separate send and receive trace arrays. Traces of the trace array 4 carry signals that travel between the proximal end 6 and the distal end 5. The trace arrays 4 can electrically connect with transducers 7 or other electrical elements at a distal end 5 of the flexure 1. As shown, the distal end 5 of the flexure 1 includes a tongue 8 which can support the transducers 7. The transducers 7 can be configured to preform read and/or write functions with spinning disk media. The trace array 4 extends to a proximal end 6 of the flexure 1. The trace array 4 can electrically connect with disk drive control circuitry 20. The disk drive control circuitry 20 can include one or more processors configured to control the function of the hard disk drive, including reading and writing functions with the transducers 7 by sending and receiving signals along the trace array 4.

FIG. 2 shows a plan view of a section of the flexure 1 of FIG. 1. The flexure 1 comprises a base metal layer 2. The base metal layer 2 can extend from the proximal end 6 to the distal end 5 of the flexure 1. The base metal layer 2 can be formed from stainless steel, however other types of metal can alternatively be used, such as copper. The base metal layer 2 can be the major structural backbone of the flexure 1. For example, most or all of the structural rigidity of the flexure 1 can be provided by the base metal layer 2. The thickness of the base metal layer 2 can be between 10-20 micrometers, for example. The base layer 2 supports a dielectric layer 3. The dielectric layer 3 can comprise a first or bottom side that directly contacts the base metal layer 2. A preferred thickness (e.g., measured along the Z-axis) of the dielectric layer 3 is 10 micrometers, although a suitable thickness can range from 5-20 micrometers for various embodiments. The thickness of the base metal layer 2 can be between 10-20 micrometers, for example. The dielectric layer 3 can be attached to the base metal layer 2. The dielectric layer 3 can be formed from a polymer, such as polyimide.

FIG. 3 shows a plan view of the section of the flexure 1 of FIG. 2 but with insulating material, such as the dielectric layer 3, removed to show detail. FIG. 4 shows a cross sectional view of the trace array 4 along line AA of FIG. 2. The trace array 4 is located on the second or top side of the dielectric layer 3. The trace array 4 comprises a plurality of traces 11-14. The traces 11-14 can be located on the top surface of the dielectric layer 3 or may be partially or fully embedded in the dielectric layer 3. A covercoat 10 can be placed over the trace array 4. The traces 11-14 can be formed from copper, however other conductive metals or other conductive materials can additionally or alternatively be used. The trace array 4 includes a pair of outer traces 11, 14 and two inner traces 12, 13. The base metal layer 2 comprises a first lateral side 15 and a second lateral side 16 separated by window 41. The window 41 is defined laterally by a first lateral edge 18 and a second lateral edge 19 and proximally and distally by bridges 45. The bridges 45 comprise sections of the base metal layer 2 that span between the first and second lateral sides 15, 16.

The plurality of traces 11-14 of the array 4 can be interleaved. Interleaved trace arrays comprise traces of alternating polarities along a width of the flexure. Specifically, the disk drive control circuitry 20 (e.g., including routing by trace jumpers) can be configured to output signals to the plurality of traces 11-14 such that each trace is adjacent only to traces having the opposite polarity. Likewise, transducers 7 or other electrical elements electrically connected with the traces 11-14 can be configured to receive, and function using, the arrangement of alternating polarized signals corresponding to the interleaved array 4. Interleaving traces can reduce impedance and improve electrical performance characteristics of the trace array 4. U.S. Pat. No. 5,717,547 to Young and U.S. Pat. No. 8,300,363 to Arai et al. disclose flexures having interleaved trace arrays, each of which is incorporated herein by reference in its entirety and for all purposes.

The traces 11-14 can be interleaved such that trace 11 carries a first polarity (e.g., positive), trace 12 carries a second polarity (e.g., negative) opposite to the first polarity, trace 13 carries the first polarity, and trace 14 carries the second polarity. The polarities can reverse during data transmission and/or can be in a different arrangement. Respective electromagnetic fields are generated by current traveling down the traces 11-14. Specifically, an electromagnetic field radiates outward from each of the traces 11-14 (e.g., along the Y-axis). The window 41 is wide enough such that the electromagnetic fields generated by the traces 11-14 do not interact with the first lateral side 15 and the second lateral side 16 of the base metal layer 2. Specifically, the pair of outer traces 11, 14 are spaced far enough away from the first and second lateral sides 15, 16, respectively, such that the pair of outer traces 11, 14 do not capacitively couple with the first and second lateral sides 15, 16, respectively. Outer traces 11, 14 would commonly be separated from the first and second lateral side 15, 16 by 50 micrometers, respectively, to prevent electromagnetic interaction between the pair of outer traces 11, 14 and the first and second lateral sides 15, 16, respectively, which may otherwise lead to loss and degradation of the respective signals carried by the pair of outer traces 11, 14. The traces 11-14 are close enough to each other such that the fields interact with adjacent traces. For example, adjacent pairs of the traces 11-14 capacitively couple to each other when current passes though the traces. It is noted that each of the outer traces 11, 14 only capacitively couples to a respective one of the inner traces 12, 13, while each of the inner traces 12, 13 respectively couples to the other inner trace 12, 13 and one of the outer traces 11, 14. As such, inner traces 12, 13 have higher (e.g., double) the capacitive interaction as outer traces 11, 14. The difference in capacitive interaction complicates synchronous electromagnetic wave propagation in the traces 11-14, as further discussed herein.

The time delay of propagation of an electromagnetic wave in a trace is governed by following equation: Time Delay=1/(Square root of L*C), wherein L refers to the inductance of the trace and C refers to the capacitance of the trace. Being that the capacitance for the inner traces 12, 13 is double that of the outer trace 11, 14, electrometric waves travel faster on the outer traces 11, 14 than the inner traces 12, 13, resulting in an appreciable difference in time delay between the inner traces 12, 13 and the outer traces 11, 14. The difference in delay means that simultaneously sent signals (e.g., sent by disk drive control circuitry 20) will be out of phase or otherwise asynchronous with each other further down the trace, which may frustrate operations that depend on synchronous signal transmission between different traces. The rate of signal propagation in the inner traces 12, 13 can be increased by lowering the inductance of the inner traces 12, 13. Specifically, the inductance of the inner traces 12, 13 can be lowered by increasing the widths of the inner traces 12, 13 relative to the outer traces 11, 14. The inner traces 12, 13 can accordingly be made substantially wider than the outer trace 11, 14, as shown in FIGS. 3-4. The inner traces 12, 13 are commonly 3-4 times wider than the outer traces 11, 14. Such difference in width between the inner traces 12, 13 and the outer trace 11, 14 evens the rate of signal propagation in the traces 11-14 of the array 4 such that simultaneously sent signals are simultaneously received.

The consequence of increasing the widths of the inner traces 12, 13 is that the footprint of the trace array 4 is enlarged, which takes up precious space on the flexure 1, causes the flexure 1 to be large and crowd other components, and increases material costs. Various embodiments of the present disclosure concern techniques for addressing asynchronous signal transmission along traces.

SUMMARY

Various embodiments concern a flexure comprising a base metal layer, the base metal layer having a window between a first lateral side of the base metal layer and a second lateral side of the base metal layer. The window can be defined by a first inner edge of the first lateral side and a second inner edge of the second lateral side. The flexure can further comprise a dielectric material layer having a first side and a second side opposite the first side, the first side of the dielectric material layer disposed against the base metal layer. The flexure can further comprise a plurality of traces extending along the second side of the dielectric material layer in an array. Each trace of the plurality of traces can overlap the window. The plurality of traces can comprise a pair of outer traces respectively located on lateral ends of the array and at least one inner trace between the pair of outer traces. All adjacent traces of the plurality of traces can be spaced a first distance from each other. The pair of outer traces can be respectively spaced a second distance from the first and second lateral edges. The first distance can be greater than or equal to the second distance. The ratio of the first distance to the second distance can be 1.0:0.3-1.6, or more specifically 1.0:0.3-1.3, or even more specifically 1.0:0.3-1.0. The array can be configured such that, when the plurality of traces conduct current, adjacent traces of the plurality of traces capacitively couple to each other and the pair of outer traces capacitively couple with each other through the first and second lateral sides, respectively. All traces of the plurality of traces can have the same width since the balancing of the electromagnetic wave is achieved through balancing the capacitance of the outer traces rather than the inductance of the inner traces. The plurality of traces can have equal electromagnetic wave propagation rates. The plurality of traces can be interleaved such that, when the plurality of traces conduct current, adjacent traces have opposite polarities Various embodiments concern a flexure comprising a base metal layer. The base metal layer can have a void between a first lateral side of the base metal layer and a second lateral side of the base metal layer. The flexure can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides. The plurality of traces can be evenly spaced between themselves. The outer spaces can be spaced from the lateral sides in any of the ranges 0.3-1.6, 0.3-1.3, or 0.3-1.0 of the spacing between the adjacent pairs of the plurality of traces. All traces of the plurality of traces can have the same width. The plurality of traces can have equal electromagnetic wave propagation rates. The plurality of traces can be interleaved such that, when the plurality of traces conduct current, adjacent traces have opposite polarities. The flexure can comprise a plurality of windows serially arrayed along the flexure from the proximal location to the distal location, wherein the void comprises one of the plurality of windows. The plurality of traces can span over each of the plurality of windows. The pair of outer traces can capacitively couple with each other through the first and second lateral sides along each of the plurality of windows.

Various embodiments concern a flexure comprising a base metal layer. The base metal layer can have a void between a first lateral side of the base metal layer and a second lateral side of the base metal layer. The flexure can further comprise a plurality of traces in an array, the plurality of traces extending over the void and between the first and second lateral sides. The plurality of traces can comprise a pair of outer traces respectively located on lateral ends of the array. At least one inner trace can be between the pair of outer traces. The plurality of traces can each have the same width. The plurality of traces and the first and second lateral sides can be spaced relative to each other such that all of the plurality of traces have equal electromagnetic wave propagation rates.

Various embodiments concern a circuit comprising a base metal layer, the base metal layer having a window between a first lateral side of the base metal layer and a second lateral side of the base metal layer. The window can be defined by a first inner edge of the first lateral side and a second inner edge of the second lateral side. The circuit can further comprise a dielectric material layer having a first side and a second side opposite the first side, the first side of the dielectric material layer disposed against the base metal layer. The circuit can further comprise a plurality of traces extending along the second side of the dielectric material layer in an array. Each trace of the plurality of traces can overlap the window. The plurality of traces can comprise a pair of outer traces respectively located on lateral ends of the array and at least one inner trace between the pair of outer traces. All adjacent traces of the plurality of traces can be spaced a first distance from each other. The pair of outer traces can be respectively spaced a second distance from the first and second lateral edges. The first distance can be greater than or equal to the second distance. The ratio of the first distance to the second distance can be 1.0:0.3-1.6, or more specifically 1.0:0.3-1.3, or even more specifically 1.0:0.3-1.0. The array can be configured such that, when the plurality of traces conduct current, adjacent traces of the plurality of traces capacitively couple to each other and the pair of outer traces capacitively couple with each other through the first and second lateral sides. All traces of the plurality of traces can have the same width. The plurality of traces can have equal electromagnetic wave propagation rates. The plurality of traces can be interleaved such that, when the plurality of traces conduct current, adjacent traces have opposite polarities Various embodiments concern a circuit comprising a base metal layer. The base metal layer can have a void between a first lateral side of the base metal layer and a second lateral side of the base metal layer. The circuit can further comprise a plurality of traces in an array. The plurality of traces can extend over the void and between the first and second lateral sides. The plurality of traces can comprise a pair of outer traces respectively located on lateral ends of the array and at least one inner trace between the pair of outer traces. The plurality of traces and the first and second lateral sides can be spaced relative to each other such that adjacent traces of the plurality of traces capacitively couple to each other and the pair of outer traces capacitively couple with each other through the first and second lateral sides. The plurality of traces can be evenly spaced between themselves. The outer spaces can be spaced from the lateral sides can be 0.3-1.6, 0.3-1.3, or 0.3-1.0 of the spacing between the adjacent pairs of the plurality of traces. All traces of the plurality of traces can have the same width. The plurality of traces can have equal electromagnetic wave propagation rates. The plurality of traces can be interleaved such that, when the plurality of traces conduct current, adjacent traces have opposite polarities. The circuit can comprise a plurality of windows serially arrayed along the circuit from the proximal location to the distal location, wherein the void comprises one of the plurality of windows. The plurality of traces can span over each of the plurality of windows. The pair of outer traces can capacitively couple with each other through the first and second lateral sides along each of the plurality of windows.

Various embodiments concern a circuit comprising a base metal layer. The base metal layer can have a void between a first lateral side of the base metal layer and a second lateral side of the base metal layer. The circuit can further comprise a plurality of traces in an array, the plurality of traces extending over the void and between the first and second lateral sides. The plurality of traces can comprise a pair of outer traces respectively located on lateral ends of the array. At least one inner trace can be between the pair of outer traces. The plurality of traces can each have the same width. The plurality of traces and the first and second lateral sides can be spaced relative to each other such that all of the plurality of traces have equal electromagnetic wave propagation rates.

Further features and modifications of the various embodiments are further discussed herein and shown in the drawings. While multiple embodiments are disclosed, still other embodiments of the present disclosure will become apparent to those skilled in the art from the following detailed description, which shows and describes illustrative embodiments of this disclosure. Accordingly, the drawings and detailed description are to be regarded as illustrative in nature and not restrictive.

DESCRIPTION OF THE INVENTION

Various embodiments of the present disclosure overcome the limitations discussed above to provide balanced signal transmission while minimizing the footprint of the trace array. Specifically, the lateral sides of the base metal layer are close enough to the trace array that the outer traces of the array capacitively couple with each other through the lateral sides of the base metal layer. Each trace is then capacitively coupled to two elements and all traces therefore have equal signal transmission delay burden. The inner traces do not need to have different dimensions relative to the outer traces to balance transmission delay, which minimizes the footprint of the trace array.

Referring back to FIGS. 1-4, a key 9 is shown indicating X, Y, and Z axes. The flexure 1 generally extends along an X-axis. The flexure 1 is generally elongated along the X-axis in distal and proximal directions, although multiple bends are typically present, as shown. A longitudinal axis of the flexure 1 accordingly extends lengthwise along the flexure 1, parallel with the X-axis. "Proximal" and "distal", as used herein, refer to the relative direction or position along the longitudinal axis of the flexure 1 while "lateral", as used herein, refers to the left and right directions (along the Y-axis) orthogonal to the longitudinal axis of the flexure 1. The flexure 1 has a generally planar orientation co-planar with the X-Y plane. The Z-axis represents height, thickness, or top and bottom orientations.

Figure 5:
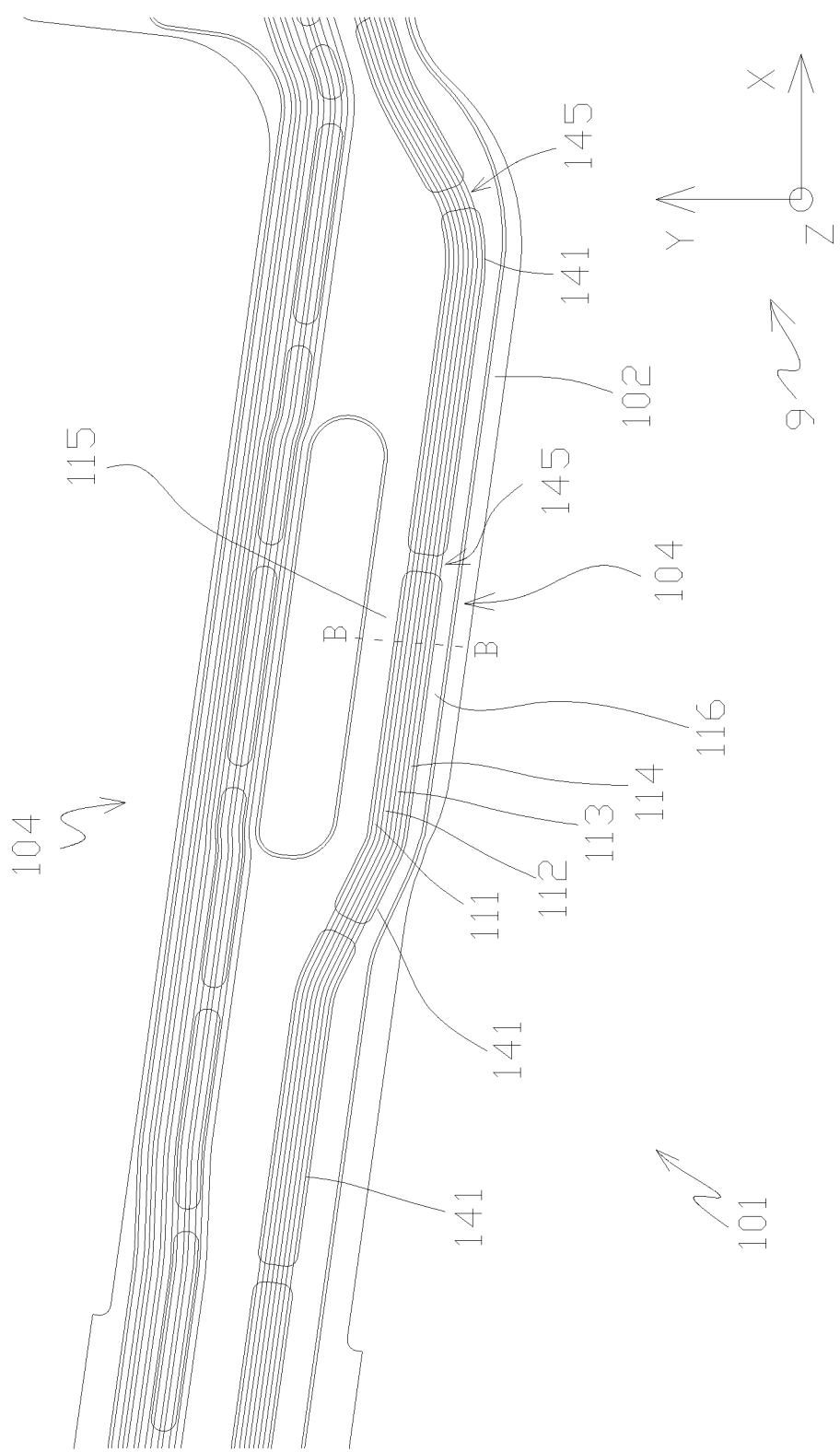
FIG. 5 is a plan view of a section of a flexure.
Figure 6:
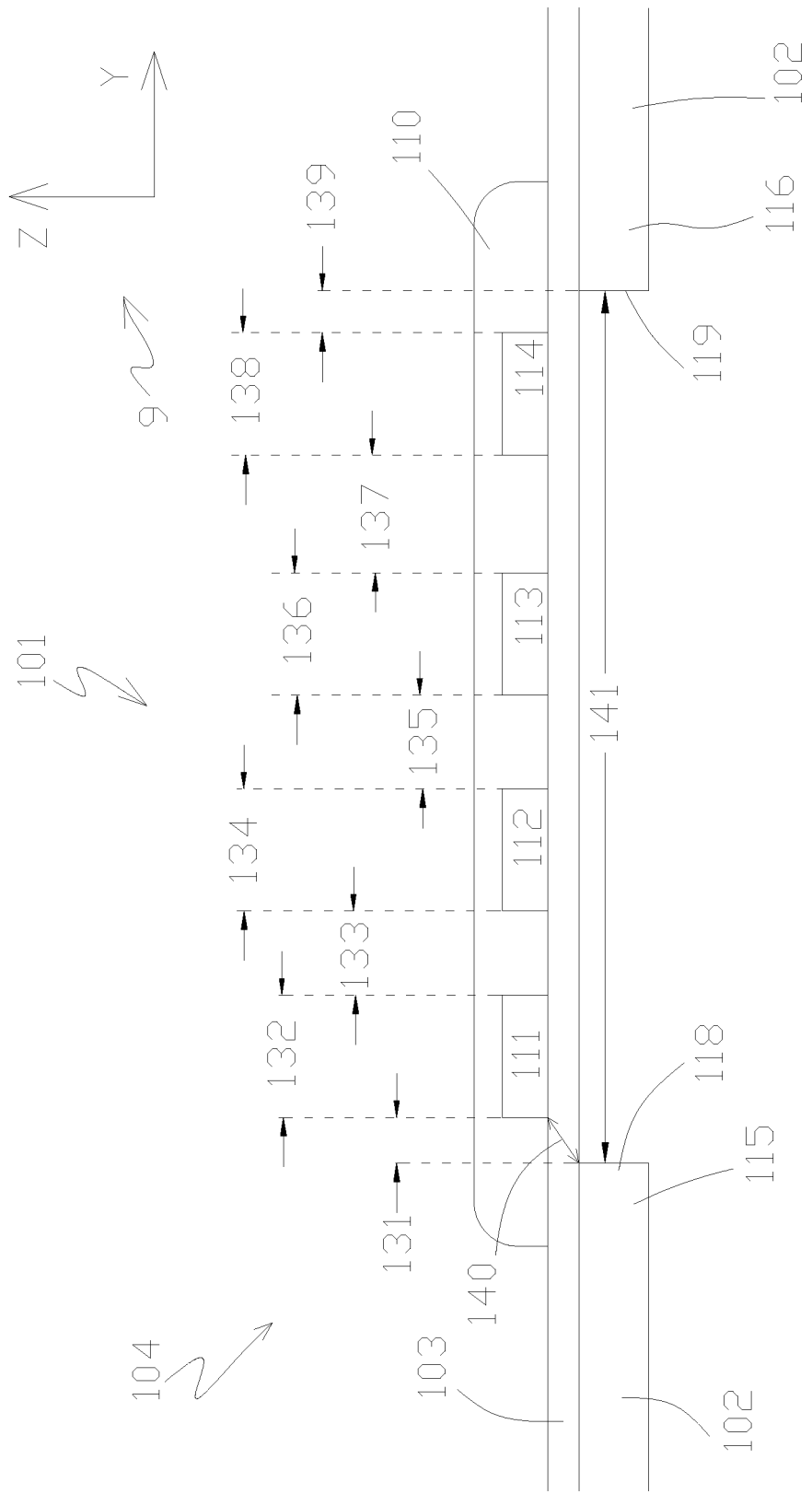
FIG. 6 is a cross sectional view of the flexure along line BB of FIG. 5.

FIG. 5 is a detailed plan view of a section of a flexure 101. The flexure 101 can be configured similarly to any other flexure of a suspension referenced herein (e.g., flexure 1). Components of the flexure 101 can be configured similarly to features of other flexures except as otherwise shown or described. For example, components having similar configurations are indicated by similar reference numbers. An insulation layer would normally be present on the top surface of the flexure 101, similar to the dielectric layer 3 in FIG. 3, but the insulation layer is removed in this view to show detail. As shown, the trace array 104 comprises traces 111-114. FIG. 6 shows a cross sectional view of the flexure 101 along line BB of FIG. 4.

Figure 1:
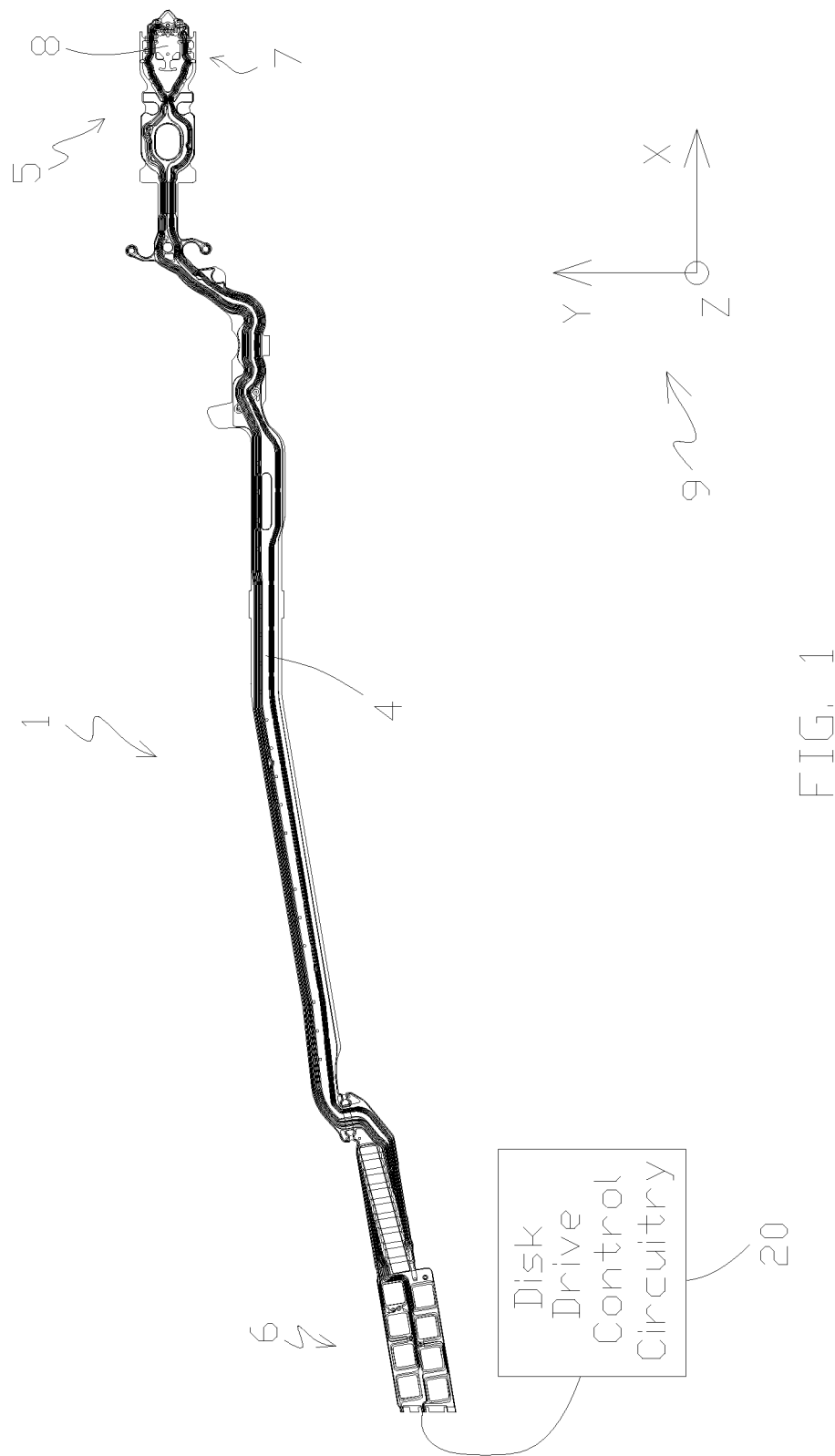
FIG. 1 is a plan view of a flexure and a suspension of a disk drive.
Figure 2:
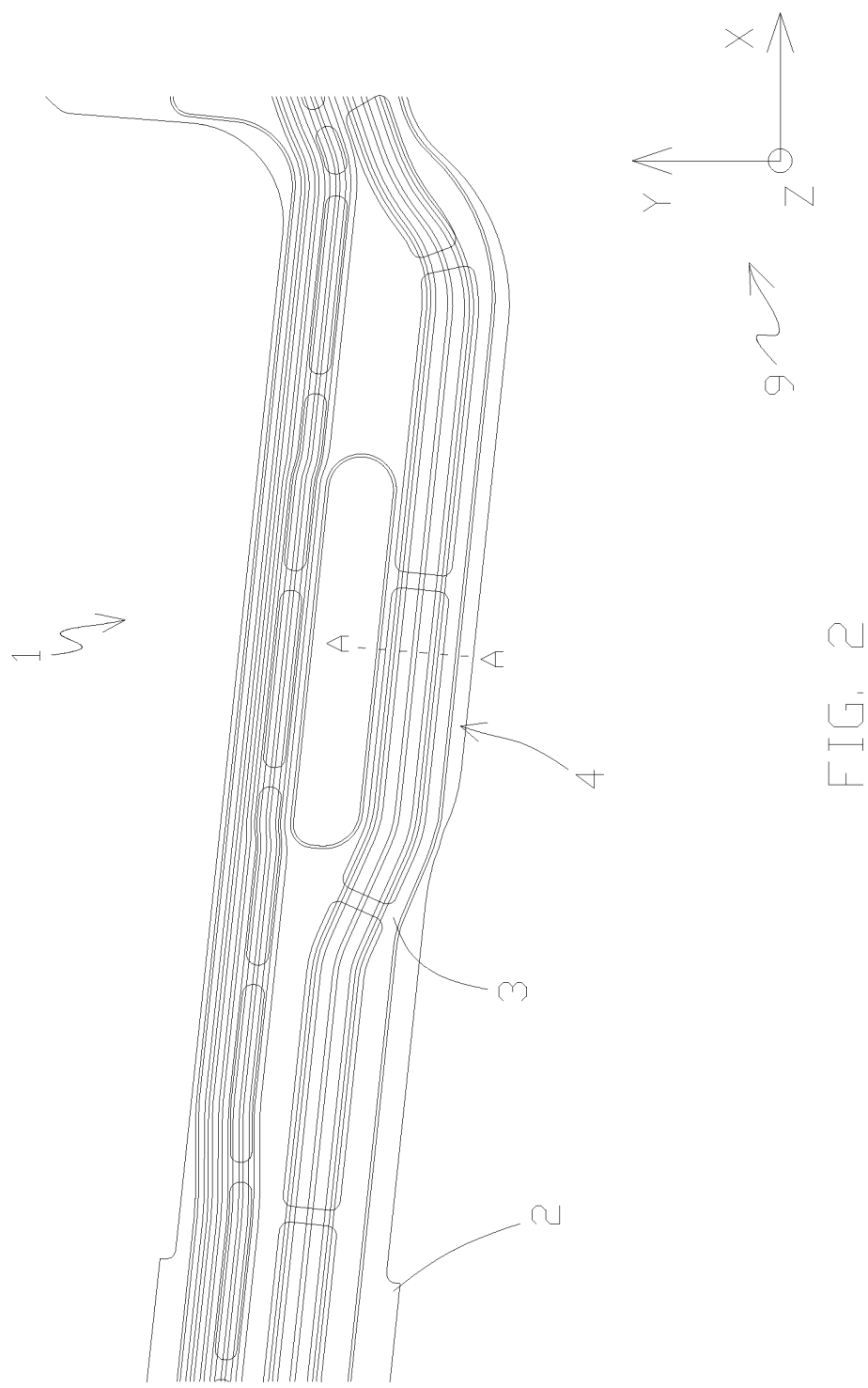
FIG. 2 is a plan view of a section of the flexure of FIG. 1.
Figure 3:
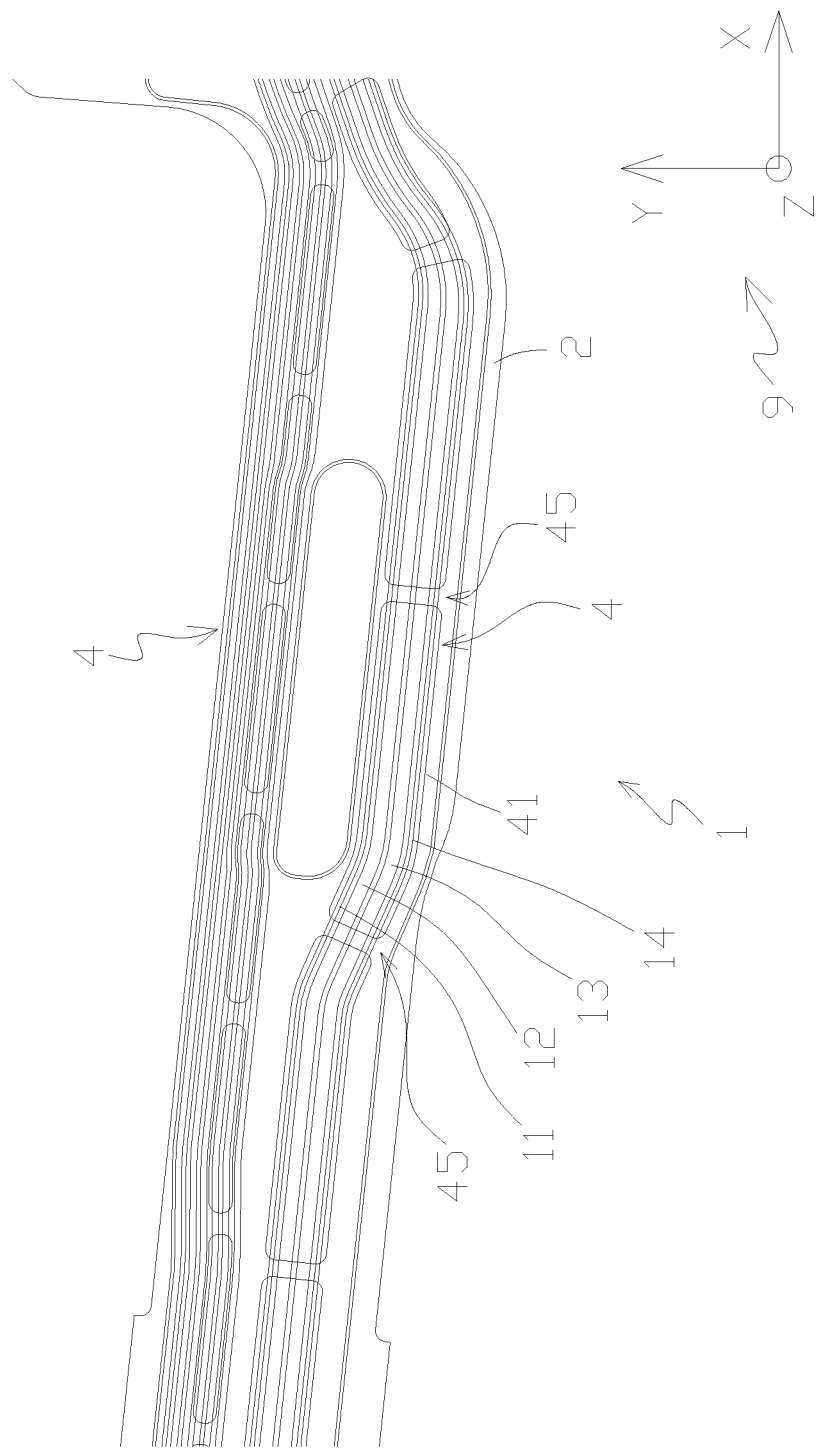
FIG. 3 is a plan view of the flexure section of FIG. 2 but with insulating material removed to reveal detail.
Figure 4:
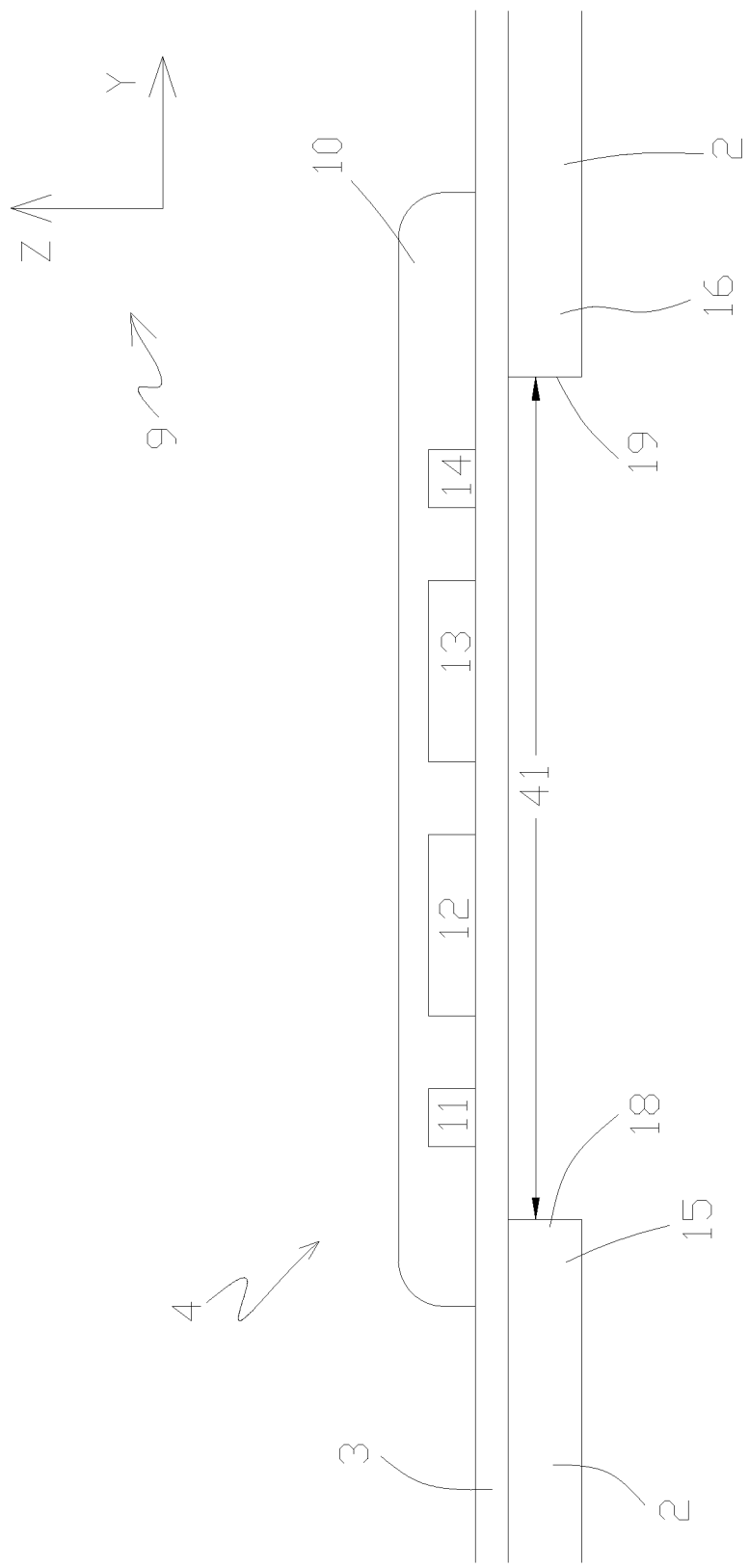
FIG. 4 is a cross sectional view of the flexure along line AA of FIG. 2.

The trace array 104 includes a pair of outer traces 111, 114, and two inner traces 112, 113. The base metal layer 102 comprises a first lateral side 115 and a second lateral side 116. The first lateral side 115 and the second lateral side 116 are separated by a window 141 between the first lateral side 115 and the second lateral side 116. The window 141 is laterally defined by a first lateral edge 118 and a second lateral edge 119. The window 141 is distally and proximally defined by bridges 145. The window 141 shown in FIG. 6 is one of a plurality of windows 141 serially arrayed along the longitudinal axis of the flexure 101 (e.g., along the X-axis), as shown in FIG. 5. As shown, each of the plurality of windows 141 is elongated along the longitudinal axis of the flexure 101 (e.g., along the X-axis). Furthermore, the plurality of windows 141 are serially arrayed along the longitudinal axis of the flexure 101 (e.g., along the X-axis). The serial arrangement of windows 141 extends parallel along the flexure 101 with the trace array 104. Referring to FIG. 1, the windows 141 can be serially arrayed from the proximal end 6 to the distal end 5 of the flexure 1. The trace array 104 can extend parallel with the serially arrayed plurality of windows 141 from the proximal end 6 to the distal end 5 of the flexure 1.

As shown in FIG. 6, a dielectric layer 103 extends over the top side of the base metal layer 102. The dielectric layer 103 can be formed from polyimide. While the base metal layer 102 includes a void in the form of the window 141, the dielectric layer 103 may not include a corresponding void and the dielectric layer 103 may accordingly extend over the window 141 from the first lateral side 115 to the second lateral side 116. A covercoat 110 may be deposited over the dielectric layer 103 and/or the trace array 104.

The trace array 104 comprises a plurality of traces 111-114. While FIGS. 5-6 show four traces 111-114 in the trace array 104, other numbers of traces are possible, such as three, five, six, or eight, among other options. Each of the traces 111-114 extends parallel with the longitudinal orientation of the windows 141, including parallel with the first and second lateral edges 118, 119 defining the windows. The traces 111-114 can remain in parallel extension with the first and second lateral edges 118, 119 along curves in the flexure 101, as shown. The traces 111-114 can remain in parallel extension with the first and second lateral edges 118, 119 along curves in the flexure 101, as shown. The traces 111-114 can remain in parallel extension with the plurality of windows 141 along most or all of the length of the flexure 101 (e.g., from the proximal end 6 to the distal end 5 of the flexure 1). The traces can be interleaved such that trace 111 carries a first polarity (e.g., positive), trace 112 carries a second polarity (e.g., negative) opposite to the first polarity, trace 113 carries the first polarity, and trace 114 carries the second polarity. The polarities can reverse during data transmission, however the differential polarities of adjacent traces can remain.

The traces 111-114 have widths 132, 134, 136, 138, respectively. The widths 132, 134, 136, 138 are preferably equal to each other. The thickness of each trace 111-114 can be between 5-20 micrometers, or more specifically between 10-12 micrometers, for example. The traces 111-114 are separated from each other by trace separation distances 133, 135, 137, respectively. The trace separation distances 133, 135, 137 can be equal to each other, such that the traces 111-114 are evenly spaced from each other along the width of the trace array 104. The trace separation distances 133, 135, 137 can be between 5-50 micrometers, or more specifically between 15-20 micrometers, for example. The outer edges of the outer traces 111, 114 are separated from the first lateral edge 118 and the second lateral edge 119 by separation distances 131, 139, respectively. The separation distances 131, 139 are preferably equal to each other. It is noted that separation distances 131-139 are all measured along one axis (e.g., along the Y-axis). Alternatively, the separation distances 131, 139 between the outer traces 111, 114 and the first and second lateral edges 118, 119 can be measures along both the Y-axis and the Z-axis. For example, the distance 140 between the outer edge of the outer trace 111 and the first lateral edge 118 can be measured directly between the outer trace 111 and the first lateral side 115. The distance 140 is out of plane or non-parallel with the general orientations of the base metal layer 102, the dielectric layer 103, and the trace array 104 (i.e. the distance 140 may not be measured solely along the Y-axis but may instead be a hypotenuse along the Y-axis and the Z-axis). As shown in FIG. 6, the width of the trace array 104 is less than the width of the window 141. The trace array 104 is located directly over the window 141 such that none of the traces 111-114 overlap with either of the first and second lateral sides 115, 116 and the traces 111-114 are between the first and second lateral edges 118, 119 along the Y-axis.

The separation distances 131, 133, 135, 137, 139 are small enough that the traces 111-114 and the first and second lateral sides 115, 116 of the base metal layer 102 capacitively couple with adjacent elements of the group. Specifically, trace 111 capacitively couples with the first lateral side 115 and trace 112. Trace 112 capacitively couples with the traces 111, 113. Trace 113 capacitively couples with the traces 112, 114. Trace 114 capacitively couples with the second lateral side 116 and trace 113. Because the first and second lateral sides 115, 116 are part of the same base metal layer 102, trace 111 essentially capacitively couples with trace 114 through the base metal layer 102. In this way, each of the traces 111-114 is capacitively coupled with two other trace elements. This is unlike the configuration of FIGS. 3-4 wherein the outer traces 11, 14 do not capacitively couple with the first and second lateral sides 15, 16, respectively and therefore do not capacitively couple to two trace elements. Each trace 111-114 being capacitively coupled to two adjacent elements results in each trace 111-114 being equally burdened by capacitive coupling and therefore having the same signal propagation delay associated with capacitive coupling. This eliminates the need to increase the inductance of the inner traces 112, 113 relative to the outer traces 111, 114, and accordingly allows the inner traces 112, 113 to have the same widths 132, 134, 136, 138 as the outer traces 111, 114.

The capacitance value measurable between the first and second lateral sides 115, 116 and the pair of outer traces 111, 114, respectively, will be approximately half that of the capacitance value between any adjacent pairs of traces 111-114. However, the electrical continuity of the first and second lateral sides 115, 116 allows the base metal layer 102 to function as one conductor that is capacitively coupled to both of the pair of outer traces 111, 114. Considering that the pair of outer traces 111, 114 can carry signals of opposite polarity, the outer traces 111, 114 can essentially capacitively couple to each other through the base metal layer 102.

The base metal layer 102 can function as a shared ground plane for the flexure 101. While the first and second lateral sides 115, 116 of the base metal layer 102 are shown in FIG. 6 as separated by window 141, the first and second lateral sides 115, 116 are nevertheless electrically coupled with each other through other areas of the base metal layer 102. For example, as shown in FIG. 5, first and second lateral sides 115, 116 are connected to each other by the bridges 145. The bridges 145 are formed by sections of the base metal layer 102 that span between the first and second lateral sides 115, 116 between the windows 141. The windows 141 are voids in the base metal layer 102 that extend from the top side of the base metal layer 102 to a bottom side of the base metal layer 102. The pattern of the bridges 145 alternating with the windows 141 can extend along some, most, or all of the length of the flexure 101 (e.g., from the proximal end 6 to the distal end 5 of the flexure 1 of FIG. 1). The bridges 145 can be located with a spacing of one per millimeter between adjacent bridges 145. As further shown in FIG. 6, the pattern extends straight along one or more sections of the flexure 101 and can bend along one or more other sections of the flexure 101. The spacing between the traces 111-114 (e.g., trace separation distances 133, 135, 137) and the spacing between the outer traces 111, 114 and the first and second lateral sides 115, 116 (e.g., separation distances 131, 139) is maintained along the length of the flexure 101, including curves, to maintain balanced capacitive coupling and equivalent signal delay in the traces 111-114 of the trace array 104 along the length of the flexure 101. The trace separation distances 133, 135, 137 between the traces 111-114 and the separation distances 131, 139 between the outer traces 111, 114 and the first and second lateral sides 115, 116 can be maintained along some, most, or all of the length of the flexure 101 (e.g., from the proximal end 6 to the distal end 5 of the flexure 1 of FIG. 1).

In some embodiments, the spacing between adjacent traces 111-114 of the trace array 104 is equal to the spacing between the outer traces 111, 114 and the first and second lateral sides 115, 116, respectively. Specifically, each of the separation distances 133, 135, 137 is equal to each of the separation distances 131, 139. In some other embodiments, the spacing between adjacent traces 111-114 of the trace array 104 is larger than the spacing between the outer traces 111, 114 and the first and second lateral sides 115, 116, respectively. For example, each of the separation distances 133, 135, 137 may be greater than each of the separation distances 131, 139. The separation distances 131, 139 being smaller than the separation distances 133, 135, 137 can ensure capacitive coupling between outer traces 111, 114 and the first and second lateral sides 115, 116, respectively. In testing, it was determined that trace arrays had acceptable performance characteristics (e.g., similar signal propagation rates) when the ratio between the separation distances 133, 135, 137 and the separation distances 131, 139 was 1.0:0.3-1.0. In other words, the distance between the inner edges of the outer traces 111, 114 and the first and second lateral edges 118, 119 is preferably 0.3-1.0 of the distance between adjacent pairs of the traces 111-114, however it is believed that a ratio between 1.0:0.3-1.6 or 1.0:0.3-1.3 may be suitable in some embodiments.

Figure 7:
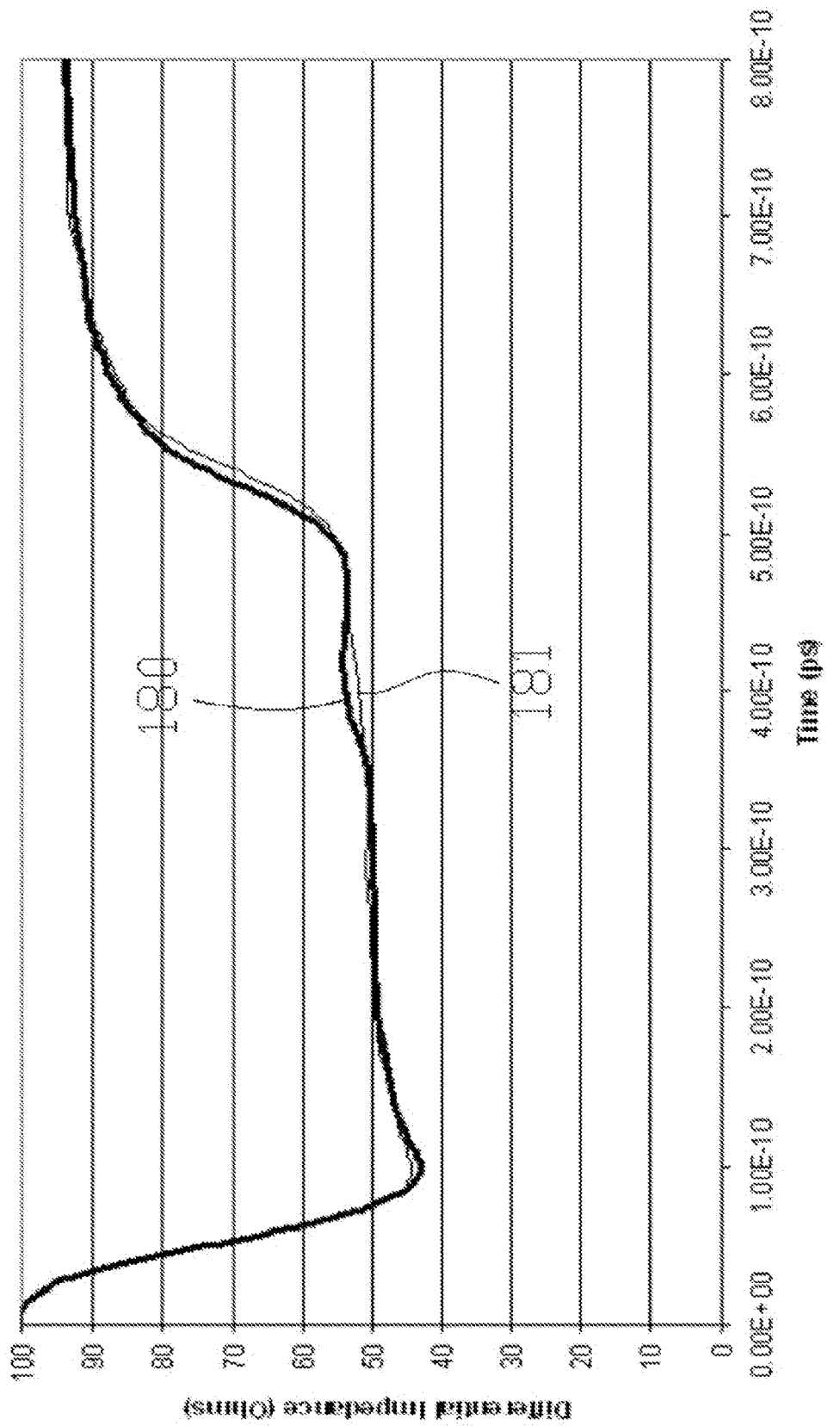
FIG. 7 is a plot comparing electrical performance data of flexures.

FIG. 7 is a plot of test data. The plot shows differential impedance data 180 for a conventional trace array similar to that shown in FIGS. 3-4. The plot further shows differential impedance data 181 for a common width trace array similar to that shown in FIGS. 5-6. As shown, the trace arrays exhibited essentially identical differential impedance performance despite the common width trace array being about 40% narrower than the conventional trace array.

Figure 8:
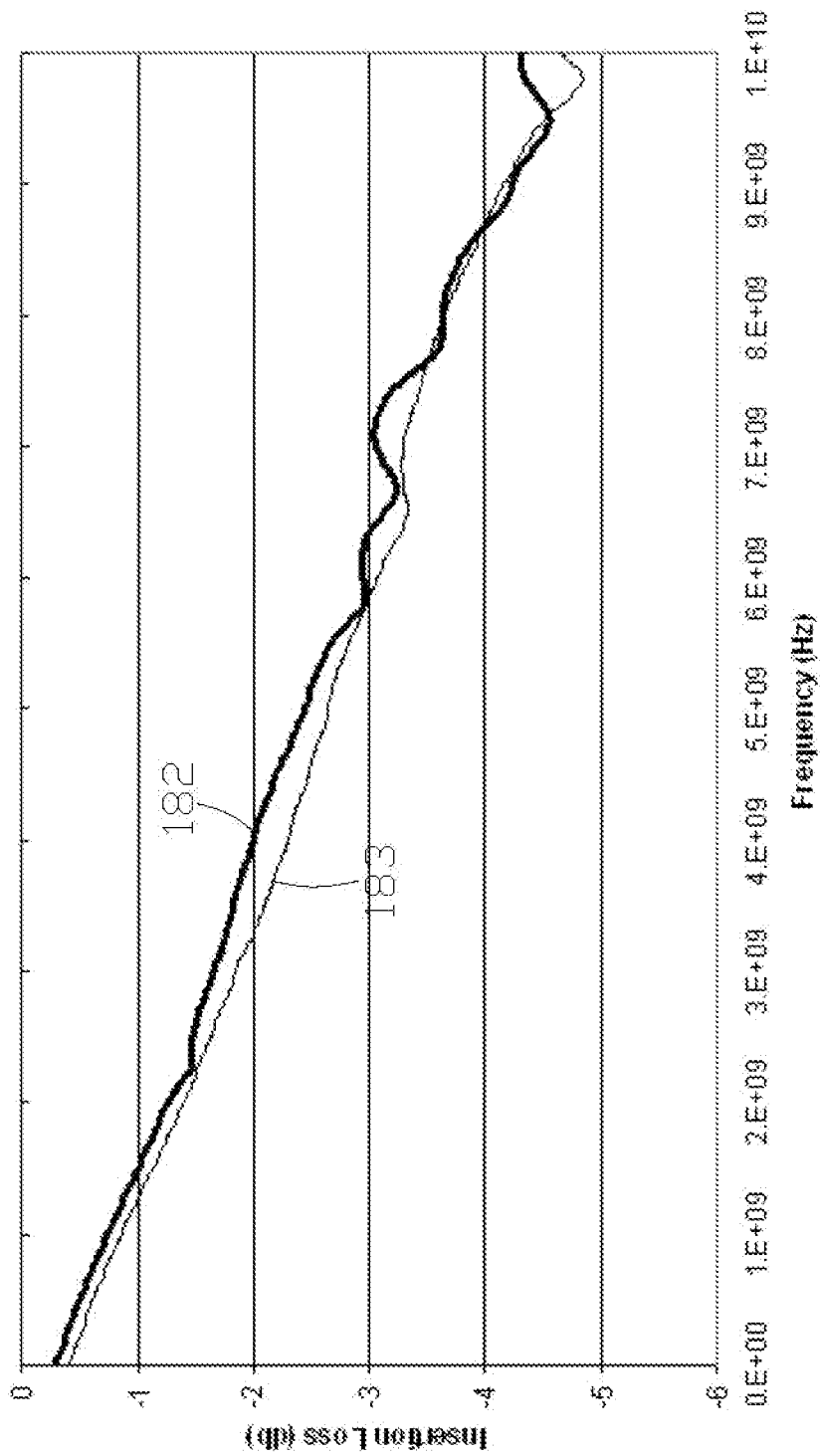
FIG. 8 is a plot comparing electrical performance data of flexures.

FIG. 8 is a plot of test data. The plot shows bandwidth performance data 183 for a conventional trace array similar to that shown in FIGS. 3-4. The plot further shows bandwidth performance data 184 for a common width trace array similar to that shown in FIGS. 5-6. As shown, the trace arrays exhibited essentially identical bandwidth performance despite the common width trace array being about 40% narrower than the conventional trace array.

Figure 9:
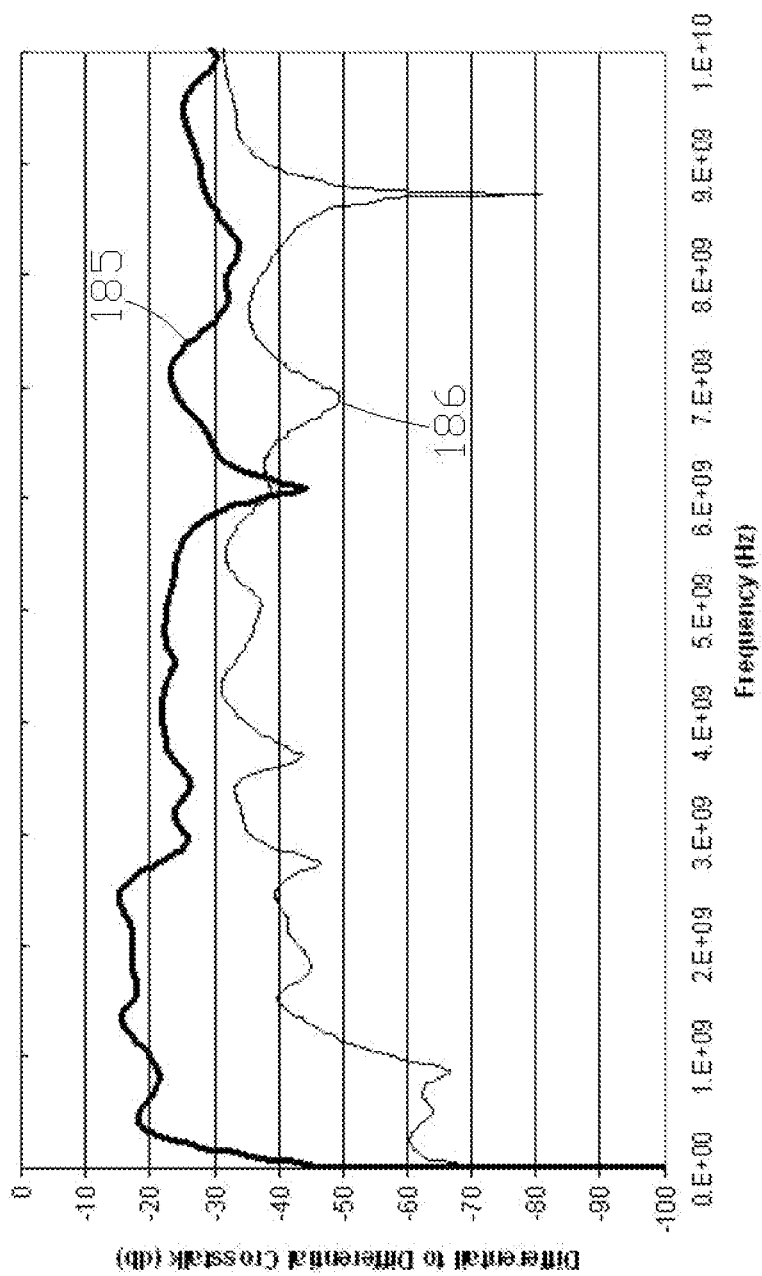
FIG. 9 is a plot comparing electrical performance data of flexures.

FIG. 9 is a plot of test data. The plot shows differential crosstalk performance data 185 for a conventional trace array similar to that shown in FIGS. 3-4. The plot further shows differential crosstalk performance data 186 for a common width trace array similar to that shown in FIGS. 5-6. As shown, the common width trace array exhibited improved differential crosstalk performance relative to the conventional trace array.

Figure 10:
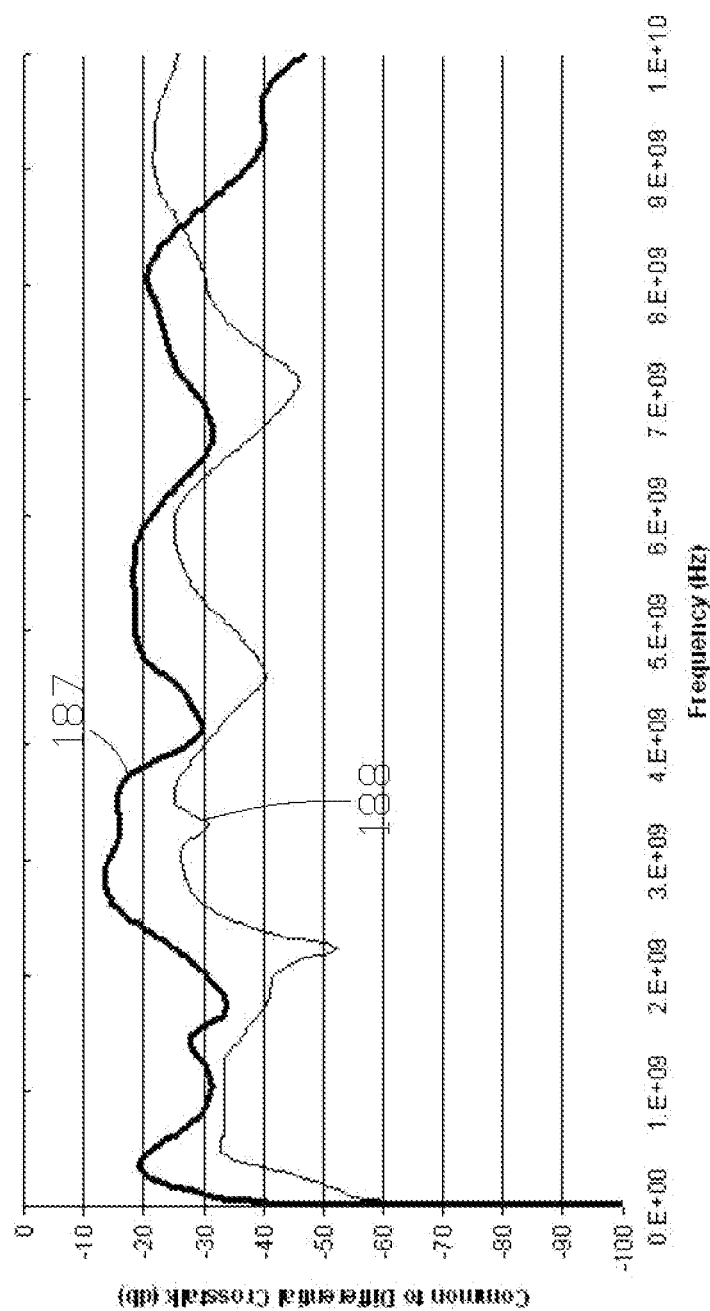
FIG. 10 is a plot comparing electrical performance data of flexures.

FIG. 10 is a plot of test data. The plot shows common crosstalk performance data 187 for a conventional trace array similar to that shown in FIGS. 3-4. The plot further shows common crosstalk performance data 188 for a common width trace array similar to that shown in FIGS. 5-6. As shown, the common width trace array exhibited improved common crosstalk performance relative to the convention trace array.

Although exemplar embodiments are presented herein to demonstrate various features of the present invention, various modifications are contemplated as being within the scope of the present disclosure. Those skilled in the art will recognize that changes can be made in form and detail to the disclosed and referenced embodiments without departing from the spirit and scope of the invention. For example, while a trace array having similar rates of signal propagation, and similar trace widths, are shown for use with a flexure, such a trace array can be employed in other circuits, other than hard disk drives. While a hard disk drive serves as a preferred exemplar, a circuit consistent with the present disclosure, such as a multi-trace array on a flexible circuit support by a windowed base metal layer to which outer traces capacitively couple to balance signal propagation rates, can be employed in any manner described herein in any other type of circuit.

The following is claimed:

1. A flexure comprising:
    a base metal layer, the base metal layer having a plurality of windows serially arranged along a longitudinal axis of the flexure, each window between a first lateral side of the base metal layer and a second lateral side of the base metal layer, the windows defined by a first inner edge of the first lateral side and a second inner edge of the second lateral side;
    a dielectric material layer having a first side and a second side opposite the first side, the first side of the dielectric material layer disposed against the base metal layer;
    a plurality of coplanar traces extending along the second side of the dielectric material layer in an array, each trace of the plurality of traces overlapping the plurality of windows, the plurality of traces comprising a pair of outer traces respectively located on lateral ends of the array and at least one inner trace between the pair of outer traces, wherein all adjacent traces of the plurality of traces are spaced a first distance from each other, the pair of outer traces are respectively spaced a second distance from the first and second inner edges, and the first distance is greater than or equal to the second distance;
    wherein the array is configured such that, when the plurality of traces conduct current, adjacent traces of the plurality of traces capacitively couple to each other and the pair of outer traces capacitively couple to each other through the first and second lateral sides and the base metal layer; and wherein the plurality of traces are interleaved such that, when the plurality of traces conduct current, adjacent traces have opposite polarities and the plurality of traces have equal electromagnetic wave propagation rates.

2. The flexure of claim 1, wherein the ratio of the first distance to the second distance is 1.0:0.3-1.0.

3. The flexure of claim 2, wherein all traces of the plurality of traces have the same width.

4. The flexure of claim 3, wherein the at least one inner trace comprises at least two inner traces.

5. The flexure of claim 4, wherein the base metal layer comprises stainless steel.

6. The flexure of claim 5, wherein the dielectric material layer comprises polyimide.

7. The flexure of claim 5, further comprising disk drive control circuitry configured to output electrical read and write signals to the plurality of traces, the signals capacitively coupling adjacent traces of the plurality of traces to each other, the signals also capacitively coupling the pair of outer traces to each other through the first and second lateral sides and the base metal layer.

8. The flexure of claim 1 wherein all the traces of the plurality of traces have the same width.

9. The flexure of claim 8, wherein the at least one inner trace comprises at least two inner traces.

* * * * *